United States Patent
Brunet et al.

(10) Patent No.: US 9,709,191 B2
(45) Date of Patent: Jul. 18, 2017

(54) UNDERWATER SUPPORT DEVICE AND INSTALLATION METHOD FOR INITIATING THE LATERAL BUCKLING OF A RIGID PIPE

(71) Applicant: TECHNIP FRANCE, Courbevoie (FR)

(72) Inventors: Philippe Brunet, Bures-sur-Yvette (FR); Sylvain Routeau, Saint-Cloud (FR); Bruno Jolin, Paris (FR); Pascal Court, Le Pecq (FR)

(73) Assignee: TECHNIP FRANCE (FR)

( * ) Notice: Subject to any disclaimer, the term of this patent is extended or adjusted under 35 U.S.C. 154(b) by 0 days.

(21) Appl. No.: 14/778,834

(22) PCT Filed: Mar. 21, 2014

(86) PCT No.: PCT/FR2014/050663
§ 371 (c)(1),
(2) Date: Sep. 21, 2015

(87) PCT Pub. No.: WO2014/147354
PCT Pub. Date: Sep. 25, 2014

(65) Prior Publication Data
US 2016/0061352 A1    Mar. 3, 2016

(30) Foreign Application Priority Data
Mar. 21, 2013 (FR) ...................... 13 52529

(51) Int. Cl.
*F16L 1/235* (2006.01)
*F16L 1/16* (2006.01)
(Continued)

(52) U.S. Cl.
CPC ................. *F16L 1/123* (2013.01); *F16L 1/20* (2013.01); *F16L 1/205* (2013.01); *F16L 1/207* (2013.01);
(Continued)

(58) Field of Classification Search
CPC ....... F16L 1/06; F16L 1/10; F16L 1/20; F16L 3/16; F16L 3/18; F16L 3/20
(Continued)

(56) References Cited

U.S. PATENT DOCUMENTS 4,128,219 A * 12/1978 Kaigler, Jr. ............... F16L 3/16
                                                    248/49
4,139,142 A *  2/1979 Maple ...................... F16L 3/16
                                                    228/175
(Continued)

FOREIGN PATENT DOCUMENTS

EP    1 624 239 A1    2/2006
FR    2 886 711 A1    12/2006
(Continued)

OTHER PUBLICATIONS

International Search Report dated Jul. 30, 2014 issued in corresponding International patent application No. PCT/FR2014/050663.
Written Opinion dated Jul. 30, 2014 issued in corresponding International patent application No. PCT/FR2014/050663.

*Primary Examiner* — Frederick L Lagman
(74) *Attorney, Agent, or Firm* — Ostrolenk Faber LLP

(57) ABSTRACT

An underwater support device and an installation method for initiating the buckling of a section of rigid underwater pipe (16) deployed on a seabed (14). The device has a longitudinal support (22) capable of being installed between the seabed and the section of rigid underwater pipe (16) in a transverse direction, in such a way as to be able to locally detach the section of rigid underwater pipe (16) from the seabed (14) and allow the rigid underwater pipe (16) to be moved relative to said longitudinal support (22) in the direction of the longitudinal support. The device also has a link member (36) to secure the rigid underwater pipe (16) and the longitudinal support (22) in such a way as to be able
(Continued)

to install said longitudinal support (22) on the seabed (14) by deploying the section of rigid pipe (26) on the seabed (14).

10 Claims, 3 Drawing Sheets

(51) Int. Cl.
    *F16L 1/12*     (2006.01)
    *F16L 1/20*     (2006.01)
    *F16L 1/24*     (2006.01)
    *F16L 3/20*     (2006.01)
    *F16L 51/04*     (2006.01)
    *F16L 57/02*     (2006.01)

(52) U.S. Cl.
    CPC ................ *F16L 1/235* (2013.01); *F16L 1/24* (2013.01); *F16L 3/20* (2013.01); *F16L 51/04* (2013.01); *F16L 57/02* (2013.01)

(58) Field of Classification Search
    USPC ........................... 405/184.4, 172, 168.1, 166
    See application file for complete search history.

(56) References Cited

U.S. PATENT DOCUMENTS

| | | | | |
|---|---|---|---|---|
| 4,140,292 | A * | 2/1979 | Kaigler, Jr. | F16L 3/16 248/49 |
| 6,450,736 | B1 * | 9/2002 | Eck | F16L 1/0246 138/106 |
| 8,075,225 | B2 * | 12/2011 | Vander Linden, III ... | F16L 1/20 405/158 |
| 8,628,272 | B2 * | 1/2014 | Alliot | F16L 1/26 405/158 |
| 2004/0234342 | A1 * | 11/2004 | Patinet | F16L 3/1075 405/184.4 |
| 2011/0081203 | A1 * | 4/2011 | Vander Linden, III ... | F16L 1/20 405/158 |
| 2011/0150576 | A1 * | 6/2011 | Alliot | F16L 1/16 405/169 |
| 2012/0263541 | A1 | 10/2012 | Lillejordet et al. | |

FOREIGN PATENT DOCUMENTS

| | | |
|---|---|---|
| GB | 2 052 673 | 1/1981 |
| GB | 2 304 394 | 3/1997 |
| WO | WO 2005/080845 A1 | 9/2005 |

\* cited by examiner

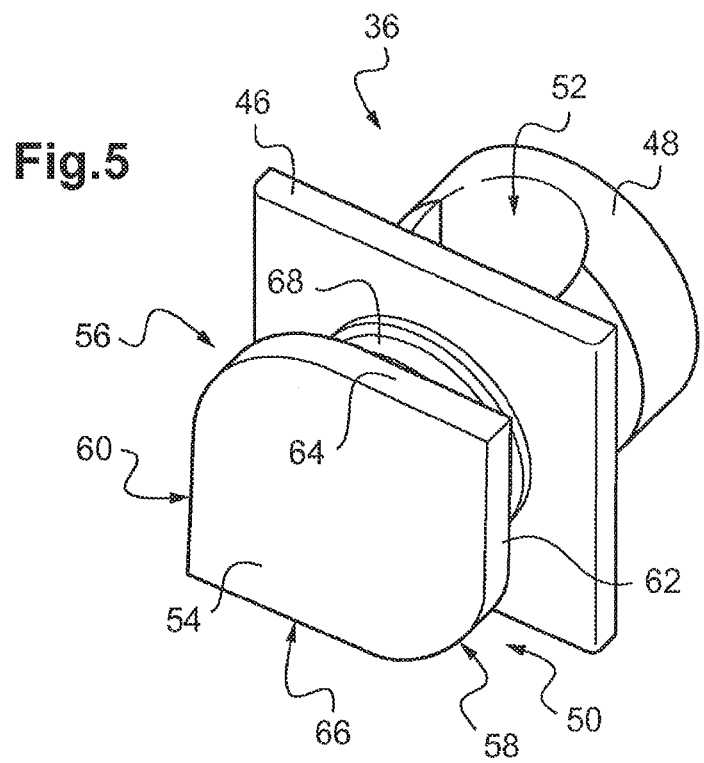
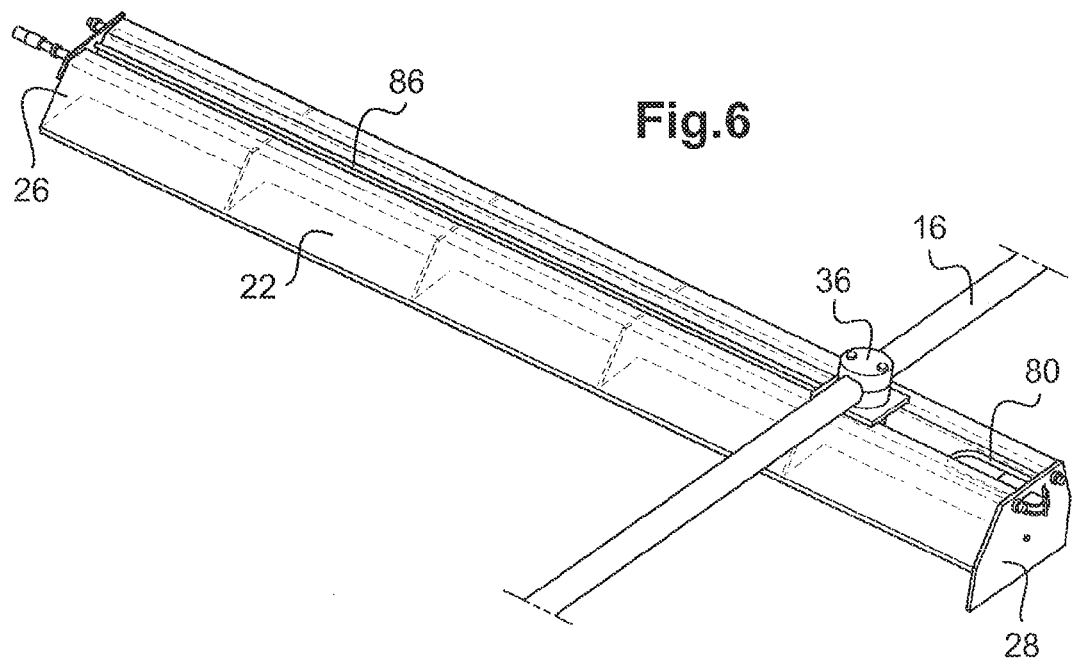

UNDERWATER SUPPORT DEVICE AND INSTALLATION METHOD FOR INITIATING THE LATERAL BUCKLING OF A RIGID PIPE

CROSS-REFERENCE TO RELATED APPLICATIONS

The present application is a 35 U.S.C. §§371 national phase conversion of PCT/FR2014/050663, filed Mar. 21, 2014, which claims priority of French Patent Application No. 1352529, filed Mar. 21, 2013, the contents of which are incorporated by reference herein. The PCT International Application was published in the French language.

TECHNICAL FIELD OF THE INVENTION

The present invention relates to an underwater support device for initiating the lateral bucking of a section of rigid underwater pipe deployed on a seabed and a method for installing a rigid underwater pipe equipped with said device.

BACKGROUND OF THE INVENTION

One field of application envisaged is that of the underwater transport of hydrocarbons, of water, of gas or of mixtures thereof. The underwater hydrocarbon drilling wells are linked to underwater installations bearing on the seabed by the rigid underwater pipes for conveying the hydrocarbons. The latter are generally extracted at a high temperature relative to the seabed temperature, and the temperature variations of the hydrocarbons or else the pressure variations, even the service outages, consequently cause thermal variations of the rigid pipe. So, the latter tends to elongate and then shrink. In order to avoid these elongations causing high axial stresses on the rigid pipe likely to cause uncontrolled lateral buckling of the rigid pipe, buckling points are initiated, step by step, where the pipe moves away laterally from its initial position. Since the lateral buckling zones are predefined by the designers, it is possible to give the rigid pipe improved characteristics offering a greater resistance to the great deformations imposed by the lateral buckling.

For this, the idea has been devised of installing transversely, step by step under the pipe, longitudinal supports, each formed by a tubular element of circular section so as to locally detach the rigid pipe from the seabed surface. The tubular element is covered with a coating facilitating the sliding of the rigid pipe. In this way, in the vicinity of the tubular element, the rigid pipe is free relative to the seabed and, consequently, the latter offers no resistance to it. Thus, when the rigid pipe tends to elongate because the hot transported fluid causes it to expand, an axial stress occurs, and it thus provokes a buckling of the rigid pipe at the transverse tubular element. In this way, the axial stress disappears.

Thus, prior to the installation of a rigid pipe from a surface vessel, tubular elements are deposited on the seabed, step by step and along the predetermined path of the rigid pipe. Then, the rigid pipe is deployed from the surface vessel on the seabed by guiding it for it to be able to come to bear exactly on the tubular elements, orthogonally.

Such a mode of implementation requires both a pre-installation of the tubular elements on the seabed and then a real accuracy in the laying of the rigid pipe. Consequently, the laying time can vary according to the weather and sea conditions.

Therefore, the problem which arises and that the present invention seeks to resolve is how to provide an underwater support device for the rigid underwater pipe that makes it possible to facilitate and shorten the laying time thereof and avoid any underwater intervention prior to the installation of the rigid pipe.

SUMMARY OF THE INVENTION

To this end, according to a first aspect, the present invention proposes an underwater support device for initiating the lateral buckling of a section of rigid underwater pipe deployed on a seabed, said device comprising a longitudinal support capable of being installed bearing on said seabed, between said seabed and said section of rigid underwater pipe in a transverse direction relative to said section of rigid underwater pipe, so as to be able to locally detach said section of rigid underwater pipe from said seabed and allow the movements of said rigid underwater pipe relative to said longitudinal support in the direction of said longitudinal support. According to the invention, the device further comprises a link member for securing said rigid underwater pipe and said longitudinal support in such a way as to be able to install said longitudinal support on said seabed by deploying said section of rigid pipe on said seabed.

Thus, a feature of the invention lies in the possibility of securing the longitudinal support and the rigid underwater pipe, and thereby being able to bring the longitudinal supports onto the seabed at the time of the deployment of the pipe precisely where required. That is to say, spaced apart from one another by the desired distance and directly under the rigid pipe. As will be explained hereinbelow in more detail, the implementation of the underwater support device is done firstly from the surface.

According to a mode of implementation of the invention that is particularly advantageous, said longitudinal support has a groove forming a slide for slidingly receiving said link member. Thus, the longitudinal support comes to bear on the seabed substantially at right angles to the rigid pipe which comes to bear on the longitudinal support. Thus, the rigid pipe is locally detached from the seabed, and the link member which links the rigid pipe and the longitudinal support is translationally guided in the groove, when the rigid pipe tends to buckle laterally.

According to a preferred embodiment, said link member is mounted to rotate in said groove. Thus, the longitudinal support can be held in a fixed position folded back parallel to the rigid pipe so as to facilitate its routing from the surface to the seabed.

According to another embodiment, said link member has a cam to allow the rotation of said link member relative to said longitudinal support by a determined angular segment. The cam is rotationally secured to the rigid pipe, and it extends inside the groove. In this way, when the longitudinal support is deployed from a position in which it extends parallel to the pipe to a position substantially at right angles to the pipe, the opposite edges of the groove, initially free relative to the cam, come to bear against it in the latter right-angled position. Thus, the longitudinal support is immobilized in rotation relative to the pipe in a direction of rotation.

According to yet another embodiment, said groove is T-shaped so as to form a widened groove bottom, and said cam is engaged in said widened groove bottom. In this way, the cam is captive in the widened bottom of the groove in such way that the link member is itself captive to the longitudinal support.

Furthermore, said link member has a through orifice for receiving said section of rigid underwater pipe. Thus, on the opposite side, the link member is captive in turn to the rigid pipe. The longitudinal support is consequently totally secured to the rigid pipe and cannot be detached therefrom during its transfer from the surface to the seabed.

Advantageously, and as will be explained in the detailed description, immobilizing collars are installed on the pipe on each side of the link member so as to be able to translationally immobilize the latter relative to the rigid pipe.

In addition, said longitudinal support has two opposite ends and, advantageously, one of said ends has an attachment member to be able to attach said link member in a position situated close to said one of said ends. Thus, the link member is translationally immobilized in said groove at one of its ends, and consequently, it can easily be folded back toward the rigid pipe to be held there at the other of its ends.

Also, the underwater support device comprises an elastic return member stretched between said link member and the other of said opposite ends of said longitudinal support. In this way, when the link member is freed of said one of said ends of the longitudinal support, the elastic return member retracts and provokes the translational driving of the longitudinal support relative to the link member to a position situated substantially mid-way between the two ends of the longitudinal support. This operation is carried out in proximity to the seabed after the longitudinal support has been routed, in such a way as to be able to bring it to bear on the seabed in a transverse position relative to the rigid pipe.

According to another object, the present invention proposes a method for installing a rigid underwater pipe on a seabed from a surface, said method being of the type whereby: a surface vessel is provided with a rigid pipe stored on said surface vessel; said rigid pipe is paid out from said surface vessel for its deployment on said seabed as said surface vessel is driven in movement on said surface; and according to the invention, it further comprises the following steps: a plurality of underwater support devices as described above are provided; said plurality of underwater support devices are stored on said surface vessel; and the underwater support devices of said plurality of underwater support devices are secured to said rigid pipe, as said rigid pipe is paid out, so as to be able to drive said underwater support devices from said surface vessel to said seabed.

Thus, contrary to the prior art, where it was necessary to first deposit and align the longitudinal supports on the seabed before installing the rigid pipe thereon, by virtue of the subject of the invention, the longitudinal supports are transported directly from the surface to the seabed at the time of the deployment of the rigid pipe. They are thus situated directly in the alignment of the rigid pipe.

BRIEF DESCRIPTION OF THE DRAWINGS

In addition, said underwater support devices are secured at a distance from one another on said rigid pipe. This distance can thus be determined on the surface by spacing them apart from one another at the desired pitch.

Other particular features and advantages of the invention will emerge on reading the following description of a particular embodiment of the invention, given as an indicative but nonlimiting example, with reference to the attached drawings in which:

FIG. 5 is a detailed perspective schematic view of a linking device; and,

FIG. 6 is a perspective schematic view, of the underwater support device illustrated in FIG. 3, in a third position.

DETAILED DESCRIPTION OF EMBODIMENTS

Figure 1:
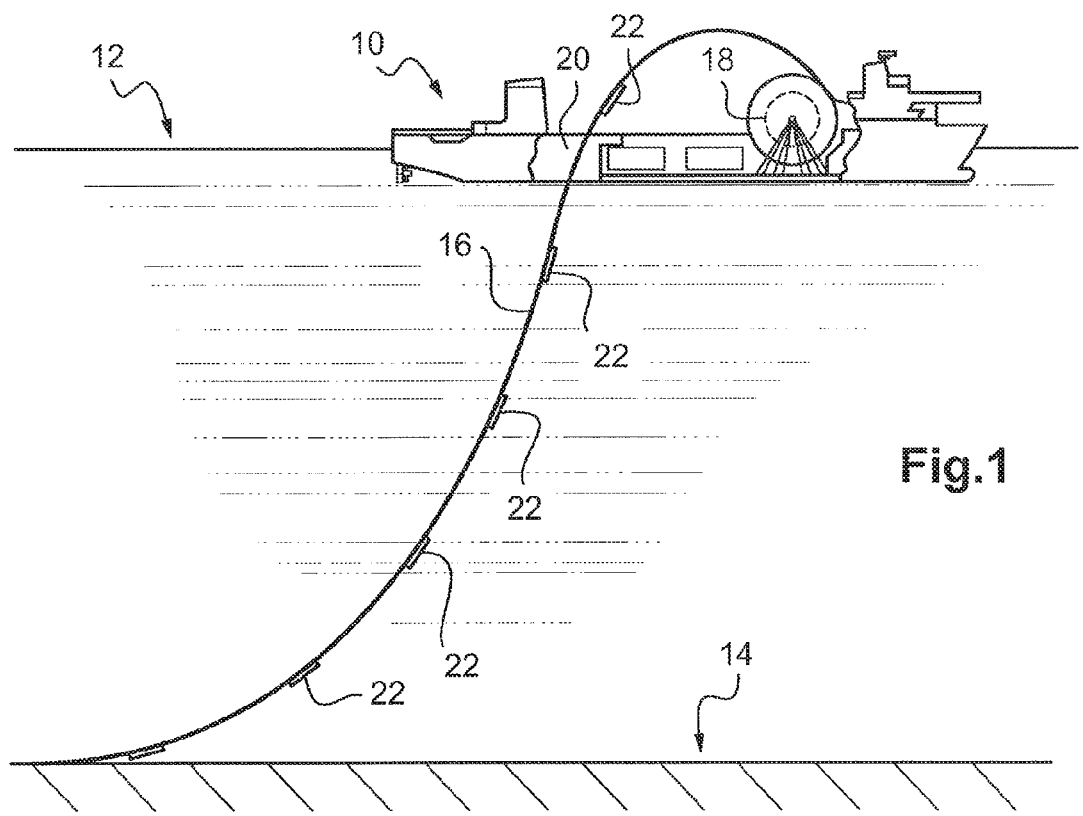
FIG. 1 is a schematic view showing an installation method according to the invention.

FIG. 1 illustrates a laying vessel 10 navigating on the surface 12 directly above a seabed 14. The laying vessel 10 represented here installs a rigid underwater pipe 16 according to a so-called "rigid-unwound" method, in which the rigid pipe 16 is forcibly wound onto a drum 18, and in which it is paid out through a well 20 in the laying vessel 10, to then be submerged and deposited bearing on the seabed 14. Furthermore the rigid underwater pipe 16 is equipped, on the laying vessel 10, as it is unwound, with underwater support devices 22.

Figure 2:
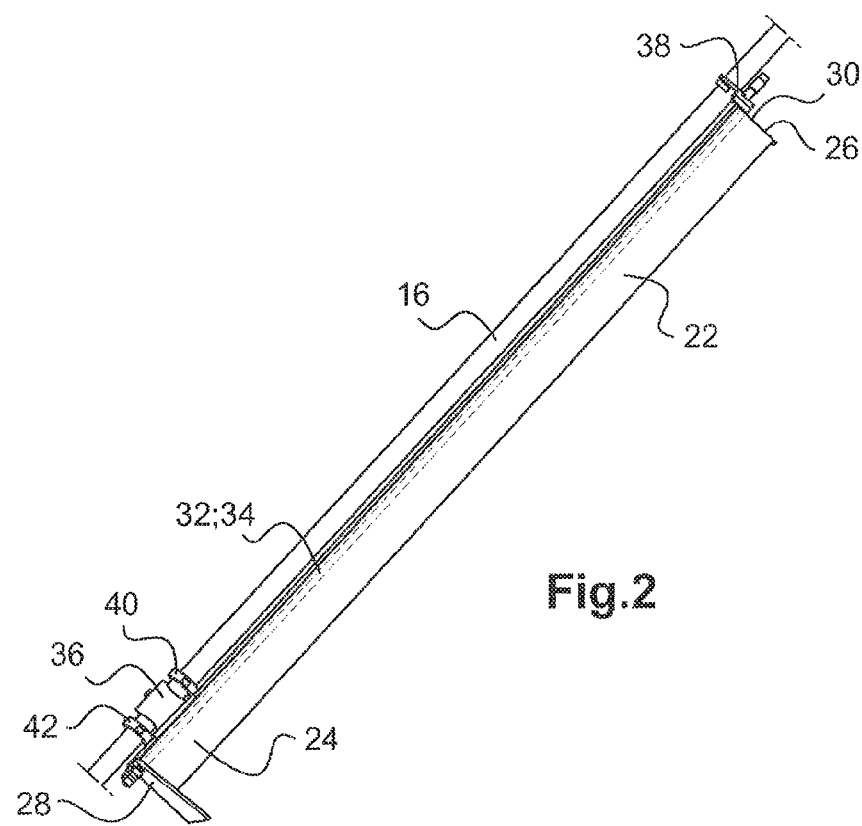
FIG. 2 is a schematic view illustrating a detail of FIG. 1 of an underwater support device in a first position.

FIG. 2 illustrates an underwater support device 22 with which a portion of rigid pipe 16 to which it is secured is equipped. The underwater support device 22 is thus installed along the rigid pipe 16, on the laying vessel 10, as the pipe 16 is unwound.

The underwater support device 22 comprises two opposite ends, a securing end 24 and an attachment end 26, spaced apart from one another by a distance of between 5 and 10 meters, for example. The securing end 24 has a heavy flange 28 while, at the opposite end, the attachment end 26 has a stop flange 30. Furthermore, the longitudinal support 22 is equipped with two structural rods 32, 34 that appear in FIG. 2 through transparency and which extend to protrude from the stop flange 30 in the attachment end 26.

The longitudinal support 22 is secured to the rigid pipe 16 via a link member 36 that will be described in more detail hereinbelow and which makes it possible to translationally immobilize it relative to the rigid pipe 16. Furthermore, at the opposite end, at the attachment end 26, the longitudinal support 22 is held along the rigid pipe 16 by means of a securing collar 38 which encircles the rigid pipe 16 and the structural rods 32, 34 extending to protrude from the stop flange 30.

Furthermore, the link member 36 that passes through a portion of rigid pipe 16 is held in translation by means of two stop collars 40, 42 installed on each side, around the rigid pipe 16. In this way, the longitudinal support 22 is held in a fixed position along a portion of the rigid pipe 16. On the other hand, the rotation about the pipe is allowed so as to ensure that the underwater device is always under the rigid pipe, even if the latter was made to turn about its axis.

A plurality of longitudinal supports 22 are supplied and stored on the laying vessel. Thus, the longitudinal supports 22 are installed on the rigid pipe 16 so as to be able to be routed to the seabed 14, as the rigid pipe 16 is deployed.

On approaching the seabed 14, the securing collar 38 is translationally driven in a direction opposite to the link member 36 so as to free the structural rods 32, 34 protruding from the stop flange 30, to also free the attachment end 26 of the rigid pipe 16. Also, the longitudinal support 22 will be able to pivot about the link member 36 to a position substantially at right angles to the rigid pipe 16 as illustrated in FIG. 3, by virtue of means that will be described hereinbelow.

Figure 3:
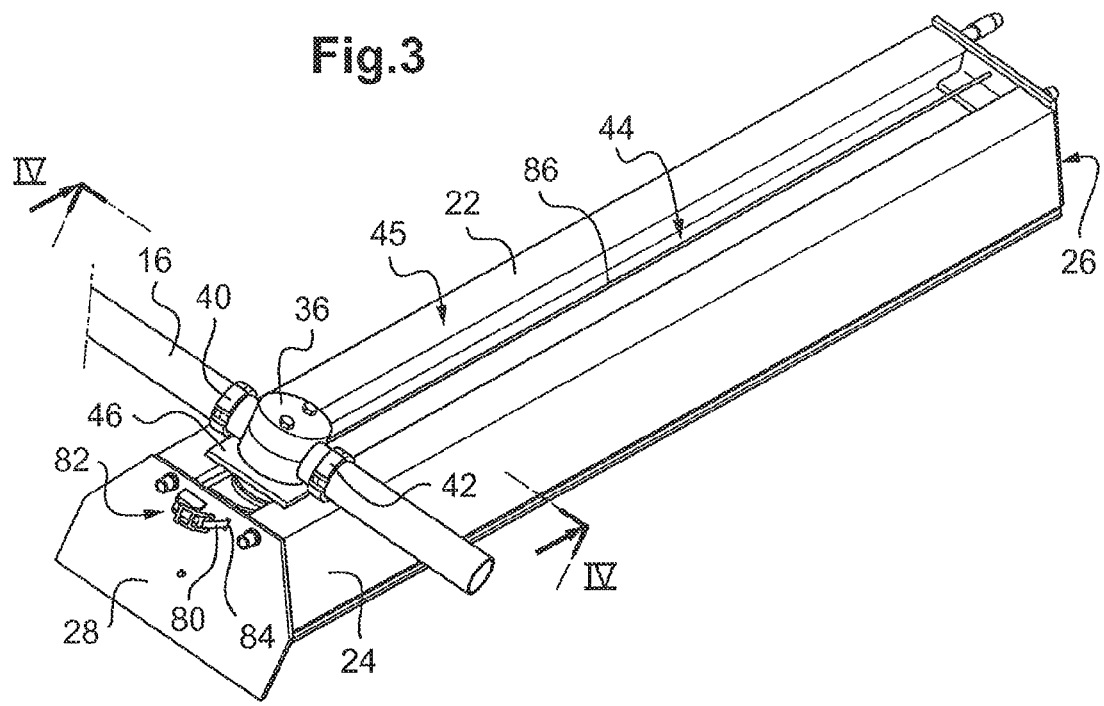
FIG. 3 is a perspective schematic view of the underwater support device illustrated in FIG. 2, in a second position.

This FIG. 3 shows the longitudinal support 22 and the link member 36 which links it to the rigid pipe 16. A T-shaped longitudinal groove 44 can be seen in this FIG. 3, formed in the top wall 45 of the support 22, from the securing end 24 to the attachment end 26. The T-shaped longitudinal groove 44 forms a slide for the link member 36.

The link member 36 will be described in detail first of all with reference to FIG. 5, where it is illustrated by a three-quarter underside view. It comprises a plate 46 separating a head 48 from a foot 50. The head 48 is passed right through by a through orifice 52 suitable for receiving the rigid pipe 16. Furthermore, it is divided into two parts, a bottom part secured to the plate 46 defining a hemicylindrical bottom part of the through orifice 52, and a top part defining a hemicylindrical top part. The two parts are linked together by two screws, screwed respectively from each side of the hemicylindrical parts.

Opposite, relative to the plate 46, the foot is equipped with a cam 54. The latter, of generally square form, extends radially relative to the foot 50 and it has two rounded opposite corners 56, 58. Furthermore, it has two first opposite bearing edges 60, 62, for transportation, and two second opposite bearing edges 64, 66, for service. It will be observed that the two first opposite bearing edges 60, 62 extend substantially parallel to the axis of the through orifice 52. Furthermore, the foot 50 has a recess 68 situated close to the plate 46.

Figure 4:
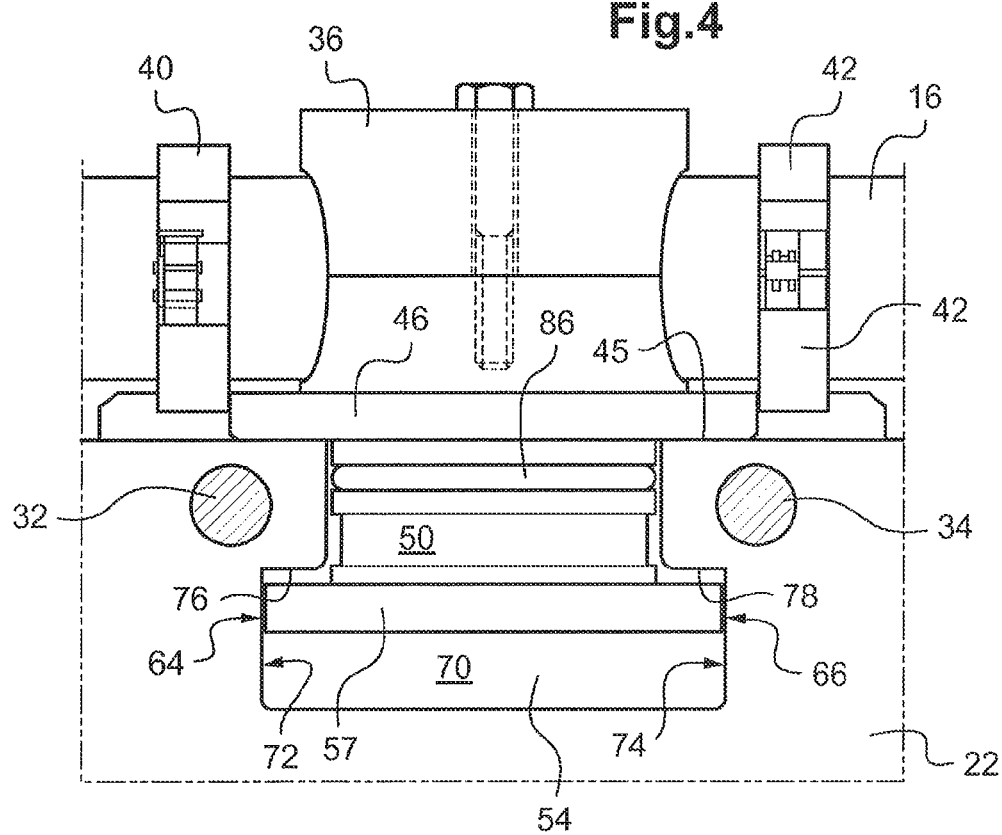
FIG. 4 is a straight cross-sectional schematic view of the underwater support device illustrated in FIG. 3 along the plane VI-VI.

Reference will be made to FIG. 4 illustrating in detail how the link member 36 cooperates, on the one hand with the rigid pipe 16 and on the other hand with the longitudinal support 22. This FIG. 4 clearly illustrates the T-shaped longitudinal groove 44, which has a widened bottom 70 forming two opposite parallel edges 72, 74 and two corresponding shoulders 76, 78. Thus, the foot 50 of the link member 36 is fitted into the T-shaped groove and 44, is fitted into the cam 54 inside the widened bottom 70. The cam 54 is then able to come to bear against the shoulders 76, 78 while the plate 46 comes to bear against the top wall 45 of the longitudinal support 22. In this way, the link member 36 is captive to the T-shaped longitudinal groove 44.

Furthermore, the two second opposite bearing edges 64, 66 are respectively in contact with the two opposite parallel edges 72, 74 of the widened bottom 70 of the T-shaped longitudinal groove 44. It will then be understood that, initially, when the support 22 extends along the rigid pipe 16, the two first opposite bearing edges 60, 62 are respectively in contact against the two opposite parallel edges 72, 74, and that, by forcibly rotating the longitudinal support 22, the two opposite parallel edges 72, 74 of the widened bottom 70 of the T-shaped longitudinal groove 44 are respectively driven around the two rounded opposite corners 56, 58. By virtue of the two other corners, not rounded, the longitudinal support 22 is immobilized in rotation in the same direction in a position substantially at right angles to the rigid pipe 16.

Thus, FIG. 3 illustrates the longitudinal support 22 and the rigid pipe 16 in this substantially right-angled position, and in which the link member 36 is held on the one hand at the securing end 24 of the longitudinal support 22 by means of a strap 80 which encircles the foot 50 of the link member 36 and which emerges through slots 82, 84 formed in the heavy flange 28, and on the other hand by a stretched elastic member 86, which encircles the foot 50, in the recess 68, and which extends longitudinally in the T-shaped groove 44 to be attached to the attachment end 26.

It will be observed that, when the rigid pipe 16 is deployed by caternary means, and when the securing collar 38 releases the structural rods 32, 34, on the one hand the longitudinal support 22 extends by its own weight below the rigid pipe 16, and on the other hand, in a substantially horizontal direction by virtue of the heavy flange 28 which rebalances the distribution of the weights relative to the body of the longitudinal support 22. Thus, as represented in FIG. 3, the longitudinal support 22 will be able to come to bear on the seabed 14 during the deployment of the rigid pipe 16.

Once all is laid on the seabed, the strap 80 is removed so as to release the link member 36, as illustrated in FIG. 6. Consequently, the elastic member 86 tends to retract and thereby drives the longitudinal support 22 in translation relative to the link member 36 to an intermediate position in which the link member 36 is situated mid-way between the heavy flange 28 and the stop flange 30. In this way, by continuing the deployment of the rigid pipe 16, the longitudinal support 22 is made to bear on the seabed, while the rigid pipe 16 is locally detached from this seabed. Similarly, the collars 40 and 42 are removed for the pipe to be able to be displaced along its axis without risking displacing the underwater support device.

Furthermore, the link member 36 is now free in translation in the T-shaped longitudinal groove 44 of the longitudinal support 22.

Also, when commissioning the rigid pipe 16, its longitudinal extension due to the thermal or internal pressure variations quite naturally provokes the buckling thereof at the longitudinal support 22 and thereby slidingly drives the link member 36 toward the end 26, relative to its initial position between the two ends 24, 26 of the longitudinal support 22.

Also, as illustrated in FIG. 1, the invention relates also to a method for installing a rigid underwater pipe and longitudinal supports 22 on a seabed 14 from a surface 12. The rigid pipe 16 and the longitudinal supports 22 are initially stored on the laying vessel 10. The rigid pipe 16 is either forcibly pre-wound on a drum, as illustrated in FIG. 1, or obtained from an assembly of sections directly on the laying vessel 10.

During the paying out of the rigid pipe 16 for its deployment on the seabed 14, the longitudinal support 22 are installed at the points determined in the in-situ analysis of the rigid pipe, in the configuration as represented in FIG. 2. For this, the pipe is installed inside the hemicylindrical bottom part of the bottom part of the head 48 of each of the longitudinal supports 22, then the top part is added and screwed on to keep the pipe captive between the two parts. The two stop collars 40, 42 are then installed on each side of the head 48.

It is only when the longitudinal supports 22 come to approach the seabed 14 that they are adjusted in position, for example by means of an underwater robot, for them to be then able to come to bear on the seabed 14.

The invention claimed is:

1. An underwater support device for initiating lateral buckling of a section of rigid underwater pipe deployed on a seabed, said device comprising:
   a longitudinal support configured for being installed on and configured for bearing on said seabed, between said seabed and said section of rigid underwater pipe in a transverse direction relative to said section of rigid underwater pipe, and configured for being installed for locally detaching said section of rigid underwater pipe from said seabed and for allowing movements of said rigid underwater pipe relative to said longitudinal support in a direction of said longitudinal support; and a link member configured for securing said rigid underwater pipe and said longitudinal support in such a way as to be able to install said longitudinal support on said seabed by deploying said section of rigid pipe on said seabed, wherein said longitudinal support is configured to be aligned with said underwater pipe during deployment and transverse to said underwater pipe when supporting said underwater pipe on said seabed.

2. The underwater support device as claimed in claim 1, wherein said longitudinal support comprises a groove forming a slide for slidingly receiving said link member.

3. The underwater support device as claimed in claim 2, wherein said link member is mounted to rotate in said groove.

4. The underwater support device as claimed in claim 3, wherein said link member comprises a cam to allow a rotation of said link member relative to said longitudinal support by a determined angular segment.

5. The underwater support device as claimed in claim 4, wherein said groove is T shaped so as to form a widened groove bottom, and said cam is engaged in said widened groove bottom.

6. The underwater support device as claimed in claim 1, wherein said link member comprises a through orifice for receiving said section of rigid underwater pipe.

7. The underwater support device as claimed in claim 1, wherein said longitudinal support comprises a first end and a second end opposite each other, said first end comprises an attachment member configured to attach said link member in a position situated close to said first end.

8. The underwater support device as claimed in claim 7, further comprising an elastic return member stretched between said link member and the second end of said longitudinal support.

9. A method for installing a rigid underwater pipe on a seabed from a surface, said method comprising the steps of:

providing a surface vessel with a rigid pipe stored on said surface vessel;

paying out said rigid pipe from said surface vessel for deployment on said seabed as said surface vessel is driven in movement on said surface;

providing a plurality of underwater support devices as claimed in claim 1, said plurality of underwater support devices being stored on said surface vessel; and securing one or more underwater support devices of said plurality of underwater support devices to said rigid pipe, as said rigid pipe is paid out, to drive said underwater support devices from said surface vessel to said seabed.

10. The installation method according to claim 9, wherein during said securing step, said underwater support devices are secured at a distance from one another on said rigid pipe.

* * * * *